US011862000B2

(12) United States Patent
Mahurkar et al.

(10) Patent No.: US 11,862,000 B2
(45) Date of Patent: Jan. 2, 2024

(54) SYSTEMS AND METHODS FOR DETECTING MOTION IN A ZONE

(71) Applicant: Verizon Patent and Licensing Inc., Basking Ridge, NJ (US)

(72) Inventors: Sagar Deepak Mahurkar, Frisco, TX (US); Anjaneya Pericharla, Irving, TX (US); Sanjay Ahuja, Irving, TX (US); Srirama R. Kalidindi, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 17/649,742

(22) Filed: Feb. 2, 2022

(65) Prior Publication Data

US 2023/0245539 A1 Aug. 3, 2023

(51) Int. Cl.
*G08B 13/196* (2006.01)
*G08B 13/184* (2006.01)

(52) U.S. Cl.
CPC ..... *G08B 13/19623* (2013.01); *G08B 13/184* (2013.01); *G08B 13/19656* (2013.01)

(58) Field of Classification Search
CPC ....... H04W 4/021; H04W 4/029; G01S 7/415; G01S 13/56; G01S 3/48; G01S 5/06
See application file for complete search history.

(56) References Cited

U.S. PATENT DOCUMENTS

| | | | | |
|---|---|---|---|---|
| 2015/0301167 | A1* | 10/2015 | Sentelle | H01Q 9/27 342/22 |
| 2016/0334498 | A1* | 11/2016 | Jamieson | G01S 5/02213 |
| 2020/0302187 | A1* | 9/2020 | Wang | H04L 25/0204 |
| 2021/0247426 | A1* | 8/2021 | Liu | G06Q 30/0645 |
| 2022/0026519 | A1* | 1/2022 | Wu | G01S 7/006 |

* cited by examiner

*Primary Examiner* — Mirza F Alam

(57) ABSTRACT

A device may receive radio frequency (RF) transmissions from access points provided in a zone, and may calculate channel state information (CSI) for the access points based on the RF transmissions. The device may identify CSI phases that satisfy a phase threshold to eliminate surrounding movement in the zone and to focus on an entry location of the zone, and may perform a short-time Fourier transform of the CSI phases to generate a frequency versus time graph. The device may perform a spectrogram analysis of the frequency versus time graph or may process the frequency versus time graph, with a machine learning model, to determine a quantity of people in the zone and a start and stop times associated with entries and exits of the people to and from the zone. The device may perform actions based on the quantity of people and the start and stop times.

20 Claims, 11 Drawing Sheets

SYSTEMS AND METHODS FOR DETECTING MOTION IN A ZONE

BACKGROUND

Detecting motion and counting moving objects may be useful for intruder detection, monitoring rental properties, judging an effectiveness of marketing campaigns, building design and layout, and/or the like.

DETAILED DESCRIPTION OF EXAMPLE EMBODIMENTS

Figure 1A:
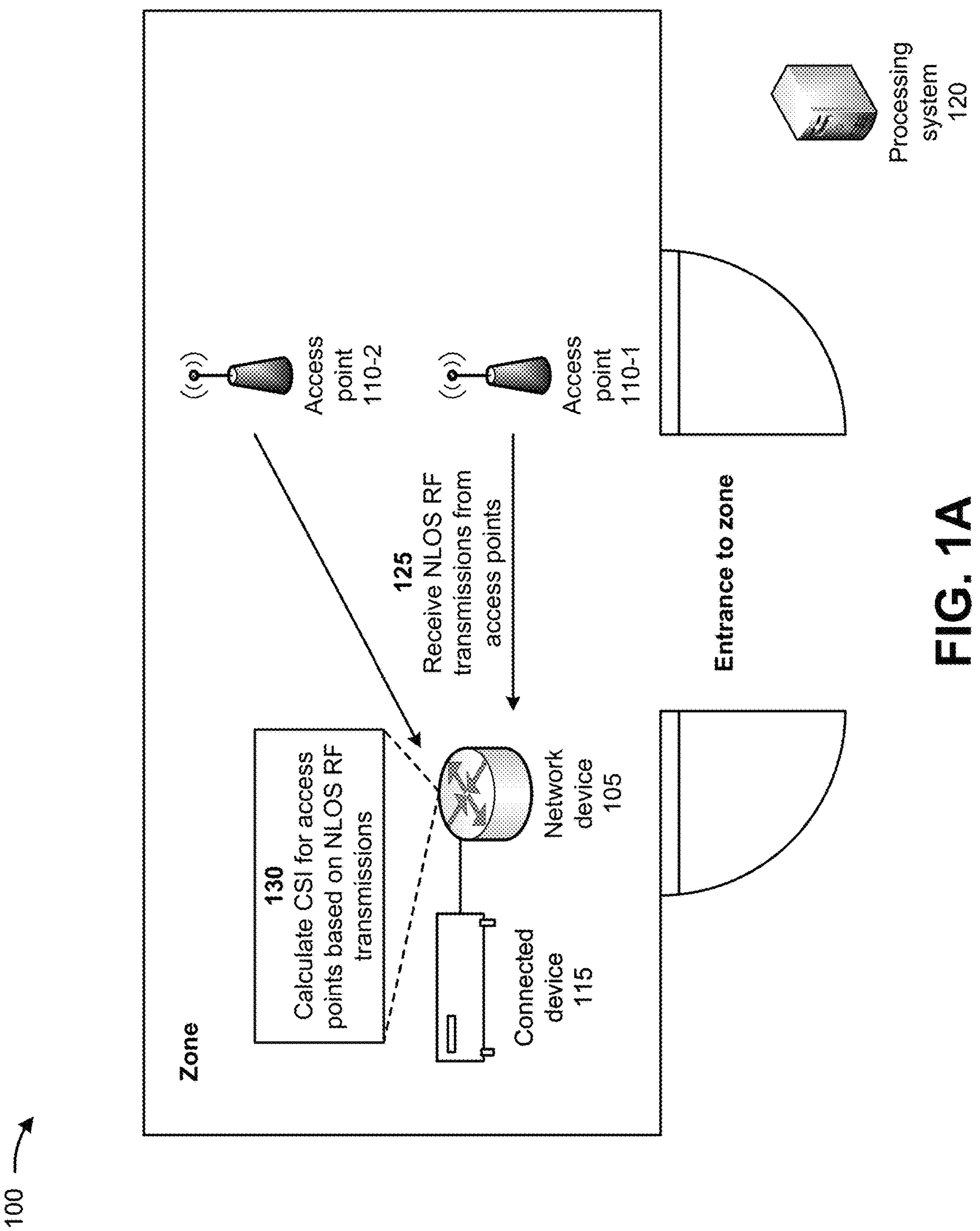
FIGS. 1A-1H are diagrams of an example associated with detecting people and movement in a zone.

The following detailed description of example implementations refers to the accompanying drawings. The same reference numbers in different drawings may identify the same or similar elements.

A traditional motion detection system may utilize multiple electronic devices to measure a quantity of vehicles, drones, people, and/or the like traversing a certain passage or entrance. The electronic devices may include video cameras, smart-flooring sensors, infrared beams, thermal imaging systems, and/or the like. However, such electronic devices may be intrusive and may require additional hardware and/or software to effectively operate. Furthermore, current standards fail to define methods to count a quantity of people in a zone since detecting simultaneous motions and segregating the motions into unique objects is challenging. Thus, current motion detection systems consume computing resources (e.g., processing resources, memory resources, communication resources, and/or the like), networking resources, and/or other resources associated with installing intrusive electronic monitoring devices, maintaining the electronic monitoring devices, maintaining software associated with the electronic monitoring devices, and/or the like.

Some implementations described herein provide a device (e.g., a network device, such as a router, a set-top box (STB), a cloud-based device, and/or the like) that detects people and movement in a zone. For example, the device may receive radio frequency (RF) transmissions from access points provided in the zone, and may calculate channel state information (CSI) for the access points based on the RF transmissions. The device may identify CSI phases that satisfy a phase threshold to eliminate surrounding movement in the zone and to focus on an entry location of the zone, and may perform a short-time Fourier transform of the CSI phases to generate a frequency versus time graph. The device may perform a spectrogram analysis of the frequency versus time graph or may process the frequency versus time graph, with the assistance of a model, to determine a quantity of people in the zone and start and stop times associated with entries and exits of the people to and from the zone. The device may perform actions based on the quantity of people and the start and stop times.

In this way, the device detects people and movement in a zone. For example, the device may collect CSI associated with devices communicating with the device via communication links in the zone. CSI is information that estimates a channel by representing channel properties of a communication link. CSI describes how a signal propagates from a transmitting device to a receiving device and reveals a combined effect of disturbances (e.g., scattering, fading, and power decay) with distance. The device may utilize the CSI to calculate a quantity of people in the zone and/or movement of people in the zone. Thus, the device may conserve computing resources, networking resources, and/or other resources that would have otherwise been consumed by installing intrusive electronic monitoring devices, maintaining the electronic monitoring devices, maintaining software associated with the electronic monitoring devices, and/or the like.

FIGS. 1A-1H are diagrams of an example 100 associated with detecting people and movement in a zone. As shown in FIGS. 1A-1H, example 100 includes a network device 105, access points 110 (e.g., a first access point 110-1 and a second access point 110-2), a connected device 115, and a processing system 120. Further details of the network device 105, the access points 110, the connected device 115, and the processing system 120 are provided elsewhere herein. Although implementations described herein relate to people detection and movement in a zone, the implementations may be utilized to detect any object (e.g., a vehicle, a drone, animals, and/or the like) and movement of any object in a zone.

As shown in FIG. 1A, a zone may include an entrance via which people may enter and/or exit the zone. The entrance need not be a door, and may enable multiple people to simultaneously enter or exit the zone. The network device 105, the access points 110, and the connected device 115 may be provided within the zone. The processing system 120 may be separate from the zone but may communicate with the network device 105, the access points 110, and/or the connected device 115. The access points 110 (e.g., STBs, smart displays, dedicated connected devices, devices not moving frequently, mobile devices, and/or the like) may communicate with the network device 105 (e.g., a router) via wireless RF transmissions. The connected device 115 may communicate with the network device 105 via wired communications and/or wireless RF transmissions. A primary access point 110 (e.g., the first access point 110-1) and the network device 105 may be aligned with the entrance of the zone to ensure optimal people detection. In some implementations, only one access point 110 may be utilized. However, people detection may be more accurate with two or more access points 110.

As further shown in FIG. 1A, and by reference number 125, the network device 105 may receive non-line-of-sight (NLOS) RF transmissions from the access points 110. For example, the network device 105 may generate RF transmissions and may transmit the RF transmissions to the access points 110. The access points 110 may receive the RF transmissions from the network device 105, and may generate the NLOS RF transmissions based on the RF transmissions. The access points 110 may provide the NLOS RF transmissions to the network device 105, and the network device 105 may receive the NLOS RF transmissions from the access points 110.

The NLOS RF transmissions may be generated based on an orthogonal frequency division multiplexing (OFDM) scheme. OFDM is a bandwidth-efficient digital multicarrier modulation scheme for wideband wireless communications.

OFDM is a form of signal modulation that divides a high data rate modulating stream (e.g., an NLOS RF transmission) into multiple streams and places the streams onto many slowly modulated narrowband close-spaced subcarriers. In this way, the multiple streams are less sensitive to frequency-selective fading. In OFDM, an overall spectrum band may be divided into many small and partially overlapped signal-carrying frequency bands called subcarriers.

As further shown in FIG. 1A, and by reference number 130, the network device 105 may calculate CSI for the access points 110 based on the NLOS RF transmissions. For example, the network device 105 may determine channel measurements at a subcarrier level based on the NLOS RF transmissions and OFDM. Thus, the network device 105 may calculate CSI for the access points 110 based on the NLOS RF transmissions and OFDM. CSI may include information that estimates a channel by representing channel properties of a communication link (e.g., a link between the network device 105 and one of the access points 110). CSI describes how a signal propagates from a transmitter (e.g., the network device 105 or the access point 110) to a receiver (e.g., the access point 110 or the network device 105) and reveals a combined effect of disturbances (e.g., scattering, fading, power decay, and/or the like) with distance.

In some implementations, the network device 105 may include a container (e.g., a Wi-Fi sensing container or a Linux container) that calculates the CSI for the access points 110 based on the NLOS RF transmissions, and/or processes the CSI. The container may standardize the CSI format into a data structure, and may be utilized for processing the CSI. This may limit operation of other containers on the network device 105. In some implementations, the network device 105 may utilize the access point 110, the connected device 115, and/or the processing system 120 to process the CSI.

In some implementations, the network device 105 may provide the NLOS RF transmissions to the connected device 115 and the connected device 115 may calculate the CSI for the access points 110 based on the NLOS RF transmissions. The network device 105 may utilize a subchannel (e.g., of the CSI) with a greatest variance for processing. A phase difference between the first access point 110-1 and the second access point 110-2 may be valuable in determining a dynamically changing phase, by eliminating a static phase offset.

Figure 1B:
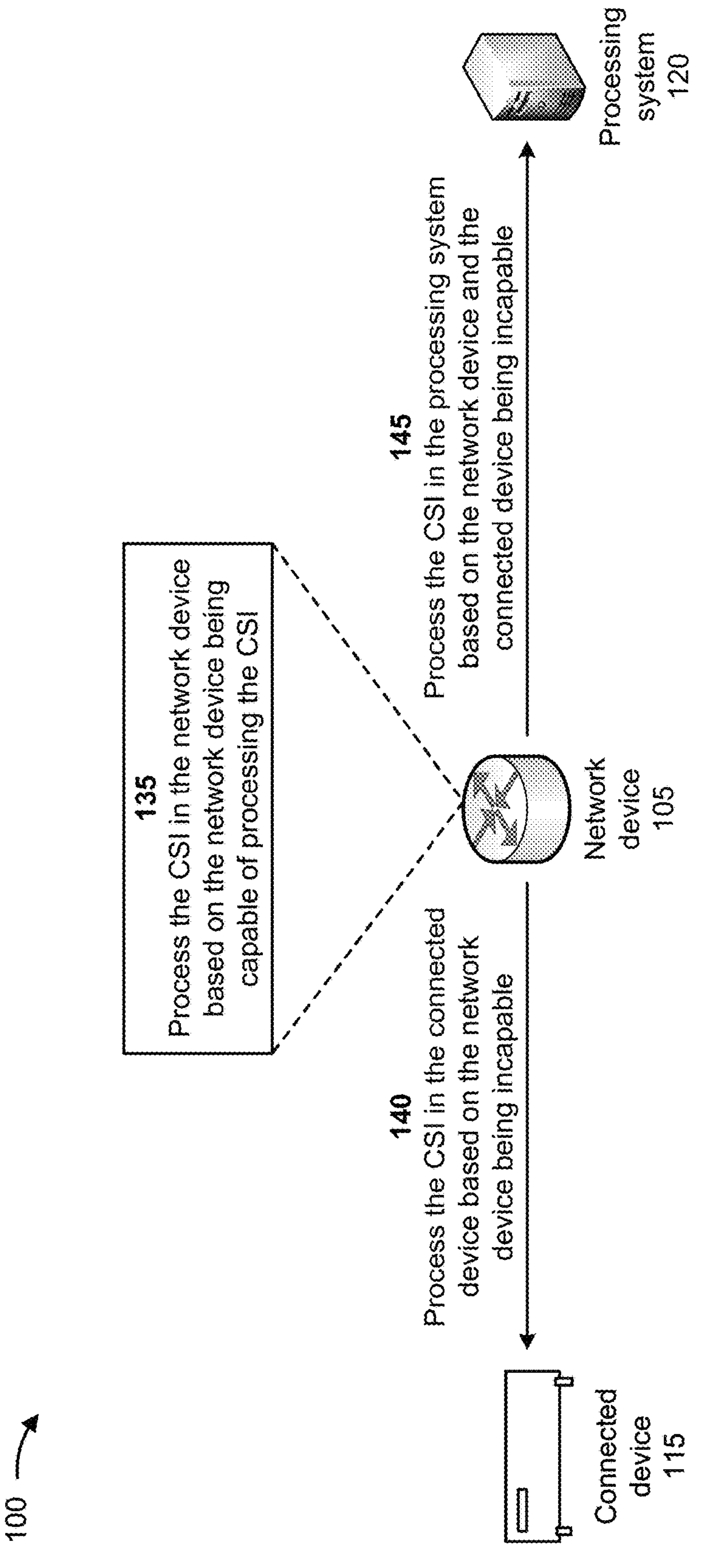

As shown in FIG. 1B, and by reference number 135, the network device 105 may process the CSI in the network device 105 based on the network device 105 being capable of processing the CSI. For example, the network device 105 may determine whether the network device 105 includes sufficient resources to process the CSI. If the network device 105 determines that the network device 105 includes sufficient resources to process the CSI (e.g., is capable of processing the CSI), the network device 105 may process the CSI in the network device 105. If the network device 105 determines that the network device 105 fails to include sufficient resources to process the CSI (e.g., is incapable of processing the CSI), the network device 105 may cause the CSI to be processed in the connected device 115 and/or the processing system 120. Further details of processing the CSI are described below in connection with the network device 105. However, the CSI may be processed by one or more of the network device 105, one of the access points 110, the connected device 115, and/or the processing system 120.

As further shown in FIG. 1B, and by reference number 140, the connected device 115 may process the CSI in the connected device 115 based on the network device 105 being incapable of processing the CSI. For example, if the network device 105 determines that the network device 105 fails to include sufficient resources to process the CSI (e.g., is incapable of processing the CSI), the network device 105 may determine whether the network device 105 includes a secure connection with the connected device 115 and whether the connected device 115 includes sufficient resources to process the CSI (e.g., is capable of processing the CSI). If the network device 105 determines that the network device 105 includes a secure connection with the connected device 115 and that the connected device 115 includes sufficient resources to process the CSI (e.g., is capable of processing the CSI), the network device 105 may cause the CSI to be processed in the connected device 115. For example, the network device 105 may provide the CSI to the connected device 115 (e.g., securely via the secure connection), and the connected device 115 may process the CSI. If the network device 105 determines that the network device 105 fails to include a secure connection with the connected device 115 or that the connected device 115 fails to include sufficient resources to process the CSI (e.g., is incapable of processing the CSI), the network device 105 may cause the CSI to be processed in the processing system 120.

As further shown in FIG. 1B, and by reference number 145, the processing system 120 may process the CSI in the processing system 120 based on the network device 105 and the connected device 115 being incapable of processing the CSI. For example, if the network device 105 determines that the network device 105 fails to include sufficient resources to process the CSI (e.g., is incapable of processing the CSI), and determines that the network device 105 fails to include a secure connection with the connected device 115 or that the connected device 115 fails to include sufficient resources to process the CSI (e.g., is incapable of processing the CSI), the network device 105 may cause the CSI to be processed in the processing system 120. The network device 105 may provide the CSI to the processing system 120, and the processing system 120 may process the CSI.

Figure 1C:
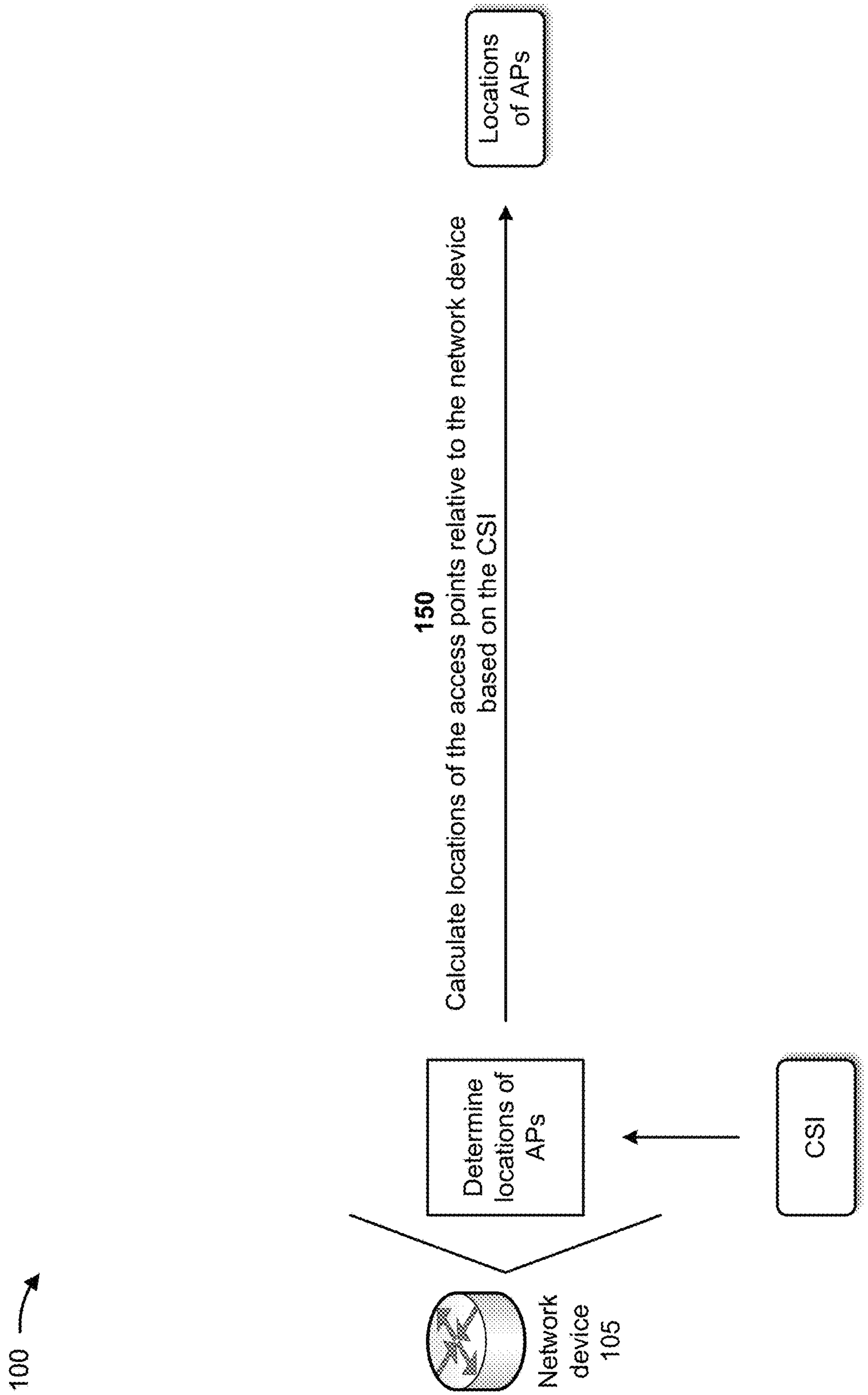

As shown in FIG. 1C, and by reference number 150, the network device 105 may calculate locations of the access points 110 relative to the network device 105 based on the CSI. For example, the CSI may include time of flight information and angle of arrival information associated with the NLOS RF transmissions. The time of flight information may include information identifying a time taken by a signal (e.g., one of the RF transmissions) to travel between the network device 105 and one of the access points 110. The network device 105 may utilize a speed of transmission of a signal medium (e.g., air) and the time taken to compute a distance between the network device 105 and the one of the access points 110. The angle of arrival information may indicate a direction from where the signal was sent (e.g., from a point of view of the network device 105). The network device 105 may utilize the direction and computed distance to compute a bi-dimensional location (e.g., via triangulation) of the one of the access points 110. The network device 105 may repeat these calculations for all of the access points 110 in order to determine the bi-dimensional locations of the access points 110. The network device 105 may utilize the bi-dimensional locations of the access points 110 to determine entry and/or exit criteria for the zone.

In some implementations, the network device 105 may store the bi-dimensional locations of the access points 110 in a data structure (e.g., a table, a database, a list, and/or the like) associated with the network device 105. The data structure may also include unique identifiers for the access points 110, manufacturer information associated with the access points 110, device names associated with the access points 110, and/or the like. The bi-dimensional locations of the access points 110 may be utilized for determining entry and exit of people to and from the zone, relative motion in the zone, mapping zones in an area, and/or the like. In case of an emergency, the bi-dimensional locations of the access points 110 may be utilized to retrieve exact locations of people and motion in the zone.

Figure 1D:
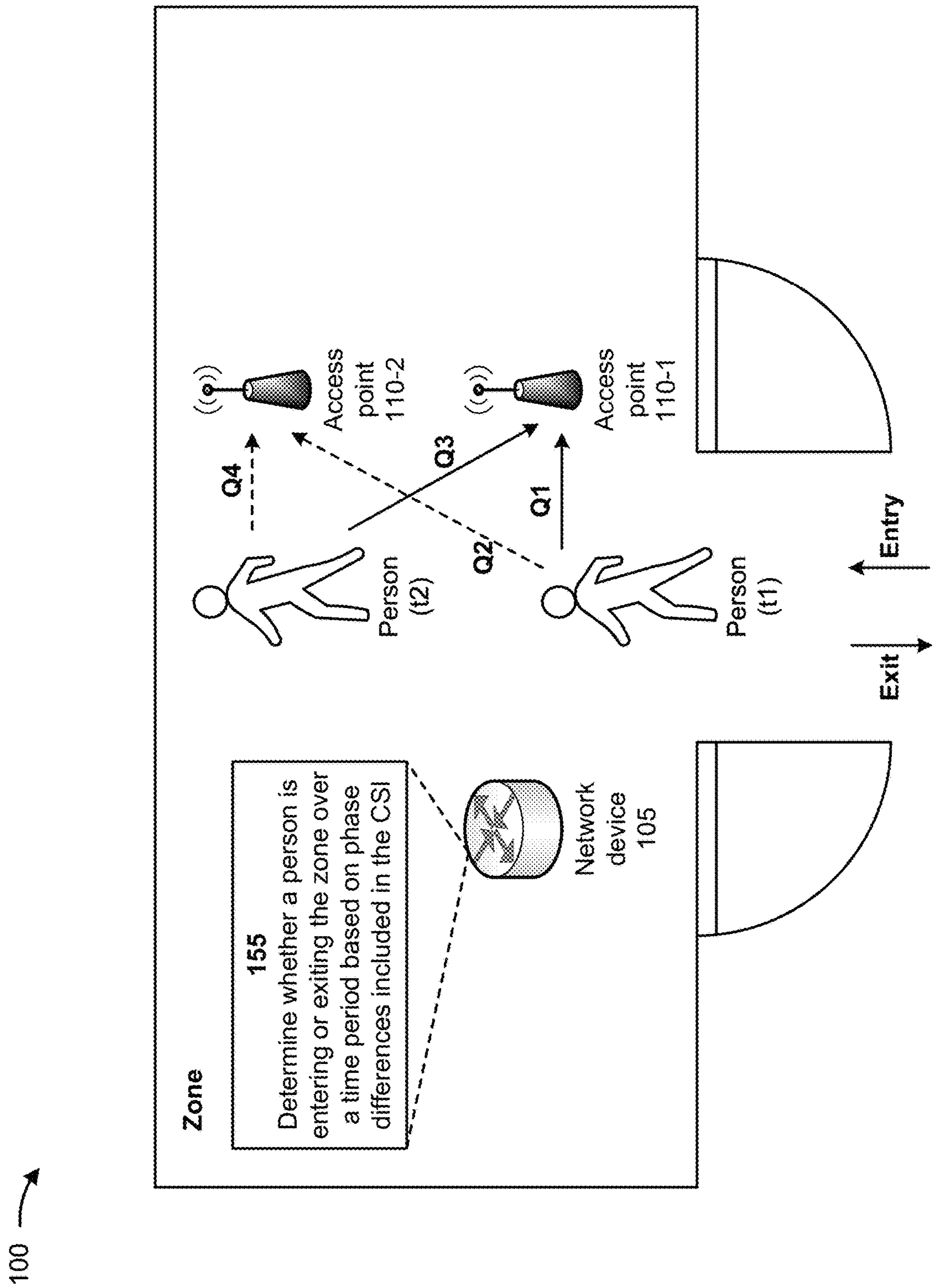

As shown in FIG. 1D, and by reference number 155, the network device 105 may determine whether a person is entering or exiting the zone over a time period based on phase differences included in the CSI. For example, the network device 105 may determine whether the person is entering or exiting the zone over the time period based on an increasing and decreasing trend of phase difference series (e.g., phases are provided by the CSI). A determination of whether the person is entering or exiting the zone may depend on the locations of the access points 110 relative to the network device 105. Hence, the bi-dimensional locations of the access points 110 may enable the network device 105 to determine whether the person is entering or exiting the zone.

In some implementations, when determining whether the person is entering or exiting the zone over the time period, the network device 105 may determine, at a first time ($t_1$), a first phase (Q1) associated with the first access point 110-1, and may determine, at the first time ($t_1$), a second phase (Q2) associated with the second access point 110-2. The network device 105 may calculate a first phase difference (e.g., Q2-Q1) based on the first phase (Q1) and the second phase (Q2), and may determine, at a second time ($t_2$), a third phase (Q3) associated with the first access point 110-1. The network device 105 may determine, at the second time ($t_2$), a fourth phase (Q4) associated with the second access point 110-2, and may calculate a second phase difference (e.g., Q4-Q3) based on the third phase (Q3) and the fourth phase (Q4). The network device 105 may determine whether the person is entering or exiting the zone (e.g., during the time period $t_2$-$t_1$) based on the first phase difference and the second phase difference.

In some implementations, motion direction may be detected by utilizing the phase difference between the access points 110 relative to the network device 105. Adding phase thresholds based on triangulation may enable noise from people already in the zone to be disregarded. Only motion at the entry location is detected to prevent false entries and exits from being detected.

Figure 1E:
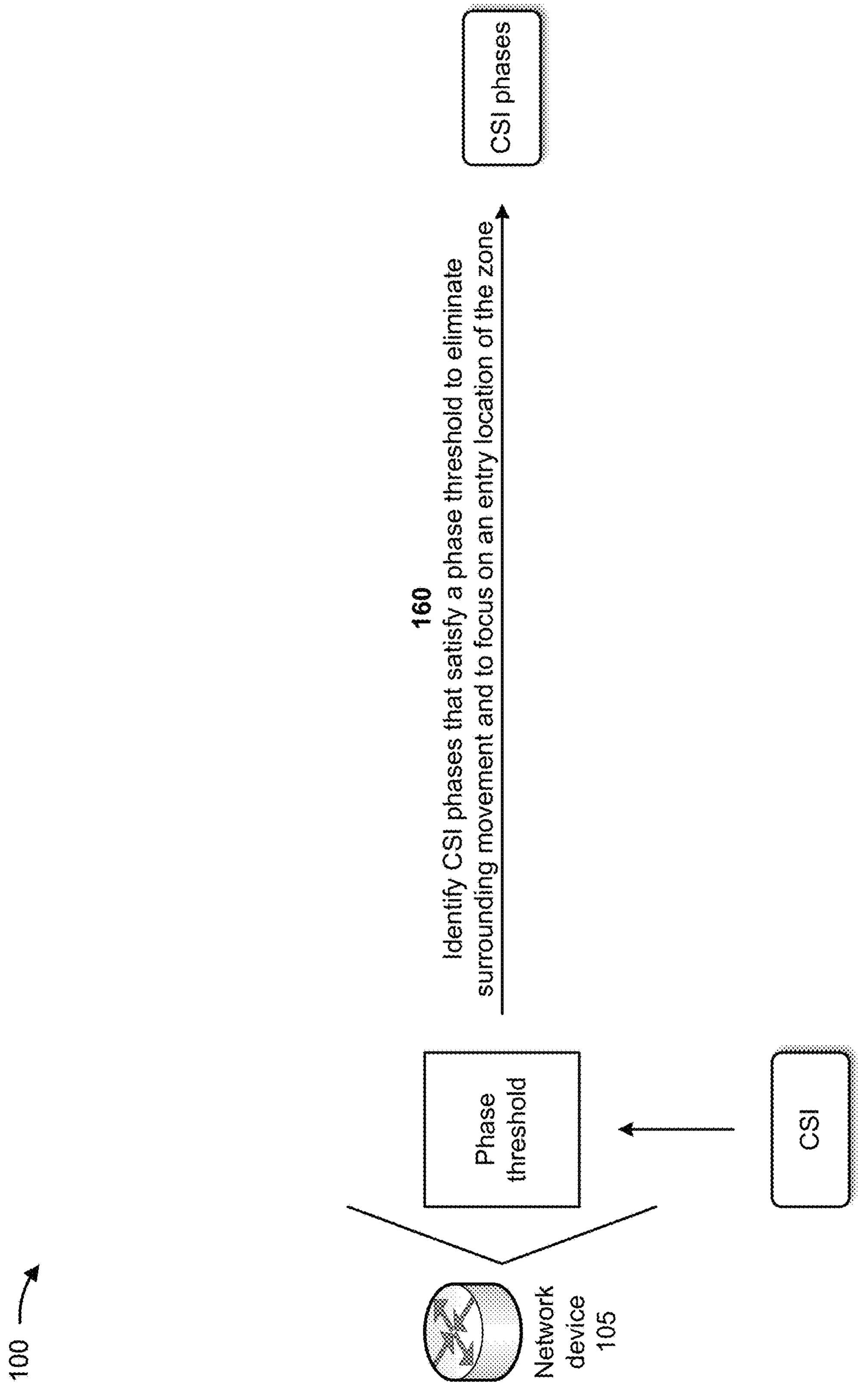

As shown in FIG. 1E, and by reference number 160, the network device 105 may identify CSI phases that satisfy a phase threshold to eliminate surrounding movement and to focus on an entry location of the zone. For example, the network device 105 may determine the phase threshold based on the determined bi-dimensional locations of the access points 110. The network device 105 may utilize the phase threshold to identify, in the CSI, the CSI phases that satisfy the phase threshold. The network device 105 may discard the CSI phases that fail to satisfy the phase threshold. The identified CSI phases may eliminate surrounding movement in the zone and may focus people detection on the entry location (e.g., the entry and the exit) of the zone.

Figure 1F:
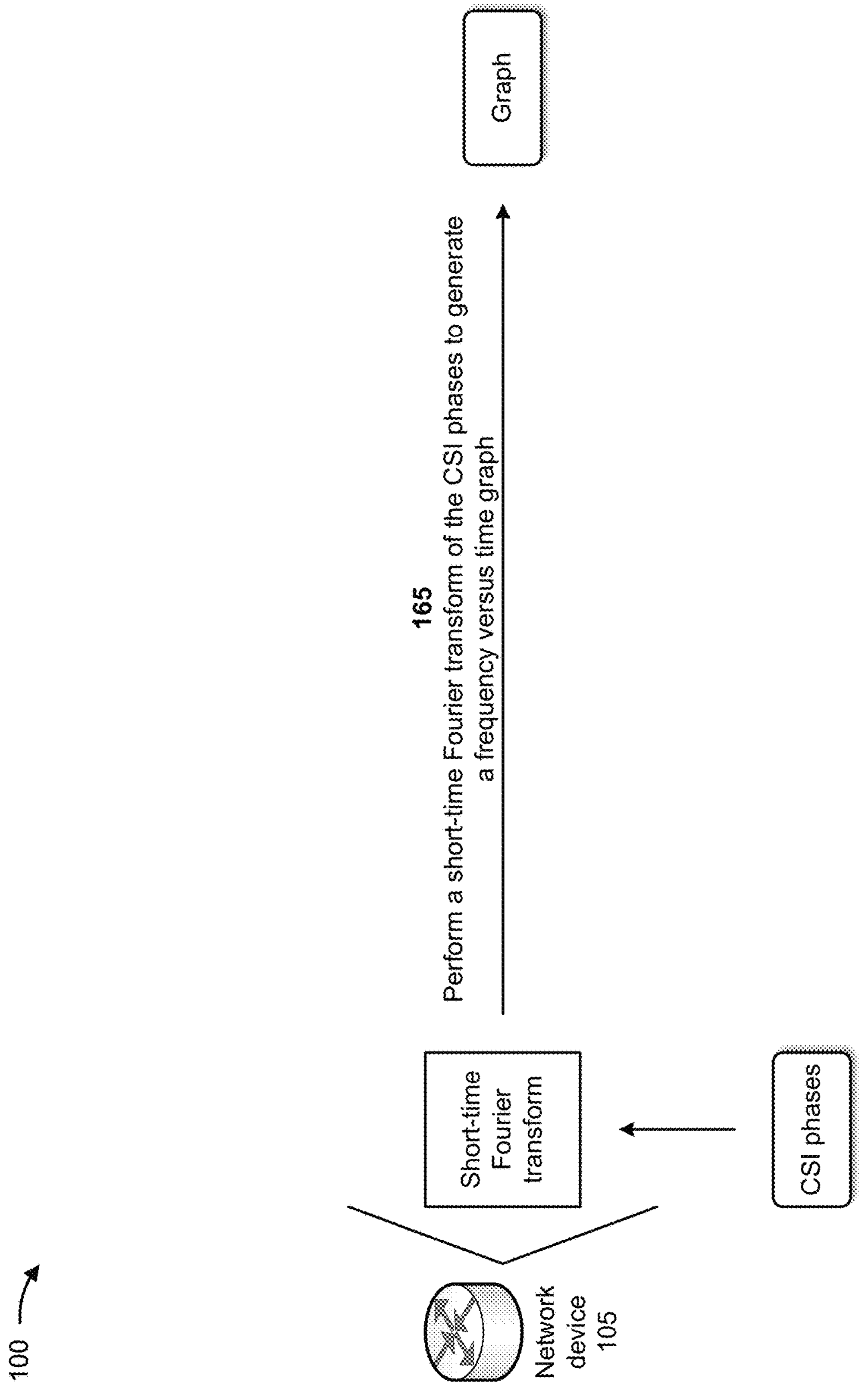

As shown in FIG. 1F, and by reference number 165, the network device 105 may perform a short-time Fourier transform of the CSI phases to generate a frequency versus time graph. For example, the network device 105 may process the identified CSI phases, with a model (e.g., a short-time Fourier transform model), to generate the frequency versus time graph. A short-time Fourier transform is a Fourier-related transform used to determine a sinusoidal frequency and phase content of local sections of a signal as the signal changes over time. Performing the short-time Fourier transform may include dividing a longer time signal into shorter segments of equal length and computing the Fourier transform separately on each shorter segment. This may reveal a Fourier spectrum on each shorter segment. The changing spectra may be plotted as a function of time, known as a spectrogram. In some implementations, more moving people near the entry location may generate a larger impact on a frequency-time area of the graph.

Figure 1G:
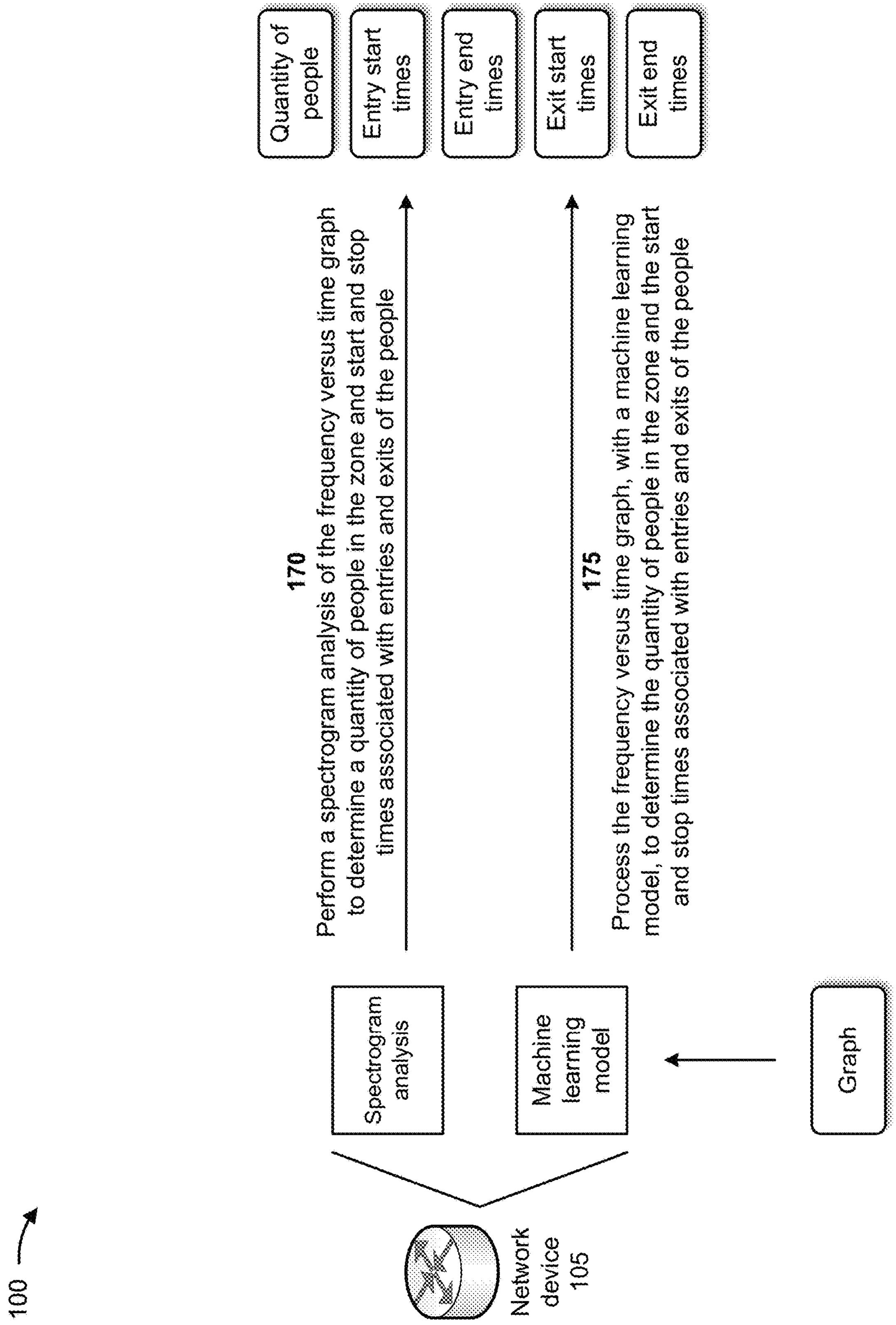

As shown in FIG. 1G, and by reference number 170, the network device 105 may perform a spectrogram analysis of the frequency versus time graph to determine a quantity of people in the zone and start and stop times associated with entries and exits of the people to and from the zone. For example, the network device 105 may perform a spectrogram analysis of the frequency versus time graph to generate a spectrogram, and may detect the quantity of people in the zone and the start and stop times associated with the entries and exits of the people to and from the zone by analyzing the spectrogram. The spectrogram on the frequency versus time graph may get wider and taller with an increasing quantity of people entering or exiting the zone as disturbances to radio waves increase. The network device 105 may calculate an exponential moving average to detect the start and stop times of entries and exits, as follows:

$$Y[n]=a*x[n]+(1-a)*Y[n-1],$$

where Y[n] corresponds to a current output (e.g., the exponential moving average), Y[n−1] corresponds to a previous output, x[n] corresponds to a current input, and a corresponds to a step value (e.g., a modifiable value, such as 0.1).

If the exponential moving average exceeds a noise threshold, the network device 105 may determine that entry or exit of people to or from the zone has started. If the exponential moving average decreases, the network device 105 may determine that motion of people to or from the zone has ceased. The network device 105 may utilize the exponential moving average to determine velocities of people entering or exiting the zone by correlating the exponential moving average with a phase difference method of determining a direction of traversal of the people. The network device 105 may determine that more people are moving in the zone when a motion energy increases. The network device 105 may determine the motion energy as follows:

$$\text{Energy}=\Sigma_{i=1}^{windowlength/2}\text{magnitude}^2,$$

where magnitude values may be normalized Fast Fourier Transform (FFT) coefficients calculated over the time window length. However, the motion energy may increase when a person runs into the zone. With enough data collected, the network device 105 may generate a lookup table based on the average velocity, the motion energy, and the quantity of people entering the zone, where the quantity of people=function (motion energy, velocity).

As further shown in FIG. 1G, and by reference number 175, the network device 105 may, alternatively or additionally, process the frequency versus time graph, with a model (e.g., a machine learning model), to determine the quantity of people in the zone and the start and stop times associated with entries and exits of the people to and from the zone. For example, the network device 105 may utilize the machine learning model to detect the quantity of people in the zone. The machine learning model may include a convolutional neural network (CNN) model or a deep learning single shot detector model. The machine learning model may detect a quantity of objects in the zone. For example, for each object in the zone, the machine learning model may determine a probability that the object in the zone, a height of the bounding box for the object, a width of the bounding box, a horizontal coordinate of a center point of the bounding box, a vertical coordinate of the center point of the bounding box, and/or the like. The machine learning model may add a quantity of the objects identified in the zone. The network device 105 may pair the quantity of objects, with the start and stop times associated with entries and exits of the people to and from the zone, to determine the quantity of people in the zone.

A collection of frequency versus time graphs in different environments (e.g., homes, malls, offices, and/or the like) may be utilized for training the machine learning model. The machine learning model may not require velocities of the people in the zone since the machine learning model may inherently process the velocities in a more accurate way than complex signal processing. The CNN model may require lesser samples for training, but may only classify a quantity of people entering or exiting the zone. The deep learning single shot detector model may require more samples for training, but may be more accurate and may be utilized to detect the velocities and the start and stop times associated with entries and exits of the people to and from the zone.

Figure 1H:
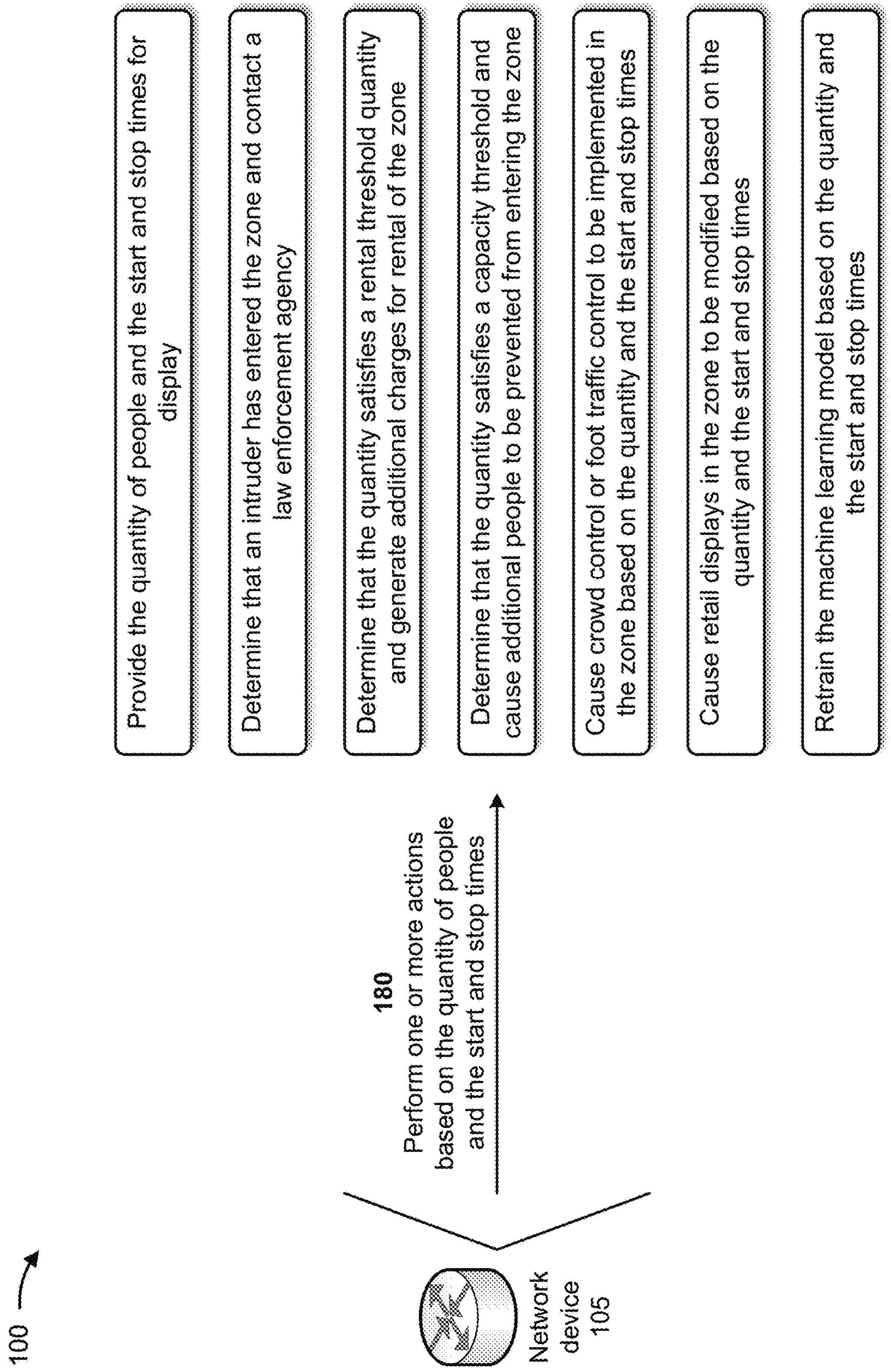

As shown in FIG. 1H, and by reference number 180, the network device 105 may perform one or more actions based on the quantity of people in the zone and the start and stop times associated with entries and exits of the people to and from the zone. In some implementations, performing the one or more actions includes the network device 105 providing the quantity of people and the start and stop times for display. For example, the network device 105 may provide information identifying the quantity of people and the start and stop times to a device (e.g., a computing device, a mobile phone, the connected device 115, and/or the like), and the device may provide the information for display. In this way, the network device 105 conserves computing resources, networking resources, and/or other resources that would have otherwise been consumed by installing intrusive electronic monitoring devices, maintaining the electronic monitoring devices, maintaining software associated with the electronic monitoring devices, and/or the like.

In some implementations, performing the one or more actions includes the network device 105 determining that an intruder has entered the zone and contacting a law enforcement agency. For example, the network device 105 may detect a person entering the zone when no one should be in the zone (e.g., when owners of the zone are not home). The network device 105 may determine that the detected person is an intruder and may contact a law enforcement agency to respond to a potential crime. In this way, the network device 105 conserves computing resources, networking resources, and/or other resources that would have otherwise been consumed by installing intrusive electronic monitoring devices, maintaining software associated with the electronic monitoring devices, and/or the like.

In some implementations, performing the one or more actions includes the network device 105 determining that the quantity satisfies a rental threshold quantity and generating additional charges for rental of the zone. For example, the zone may be a rental home that limits a quantity of people in the rental home (e.g., via the rental threshold quantity). The rental home may charge extra fees for people entering the zone over the rental threshold quantity. If the network device 105 determines that the quantity of people in the zone satisfies (e.g., exceeds) the rental threshold quantity, the network device 105 may generate additional charges for the rental of the zone. In this way, the network device 105 conserves computing resources, networking resources, and/or other resources that would have otherwise been consumed by maintaining the electronic monitoring devices, maintaining software associated with the electronic monitoring devices, and/or the like.

In some implementations, performing the one or more actions includes the network device 105 determining that the quantity satisfies a capacity threshold and causing additional people to be prevented from entering the zone. For example, the zone may include a capacity threshold for safety purposes (e.g., fire safety purposes, building code purposes, and/or the like). If the network device 105 determines that the quantity of people in the zone satisfies the capacity threshold, the network device 105 may alert an entity in charge of the zone to prevent additional people from entering the zone. In this way, the network device 105 conserves computing resources, networking resources, and/or other resources that would have otherwise been consumed by installing intrusive electronic monitoring devices, maintaining the electronic monitoring devices, and/or the like.

In some implementations, performing the one or more actions includes the network device 105 causing crowd control or foot traffic control to be implemented in the zone based on the quantity and the start and stop times. For example, the zone may be a sports arena associated with a sporting event. When the sporting event ends, the network device 105 may determine that the zone is becoming overcrowded based on the quantity and the start and stop times. The network device 105 may alert an entity in charge of the sports arena to implement crowd control or foot traffic control in the zone based on the zone becoming overcrowded. In this way, the network device 105 conserves computing resources, networking resources, and/or other resources that would have otherwise been consumed by maintaining the electronic monitoring devices, maintaining software associated with the electronic monitoring devices, and/or the like.

In some implementations, performing the one or more actions includes the network device 105 causing retail displays in the zone to be modified based on the quantity and the start and stop times. For example, the zone may be in a store selling merchandise and network device 105 may determine that a larger quantity of people are in the zone during certain times of the day. Based on this determination, the network device 105 may alert an entity in charge of the store to modify retail displays (e.g., to display more merchandise) in the zone during the certain times of the day (e.g., to generate more sales). In this way, the network device 105 conserves computing resources, networking resources, and/or other resources that would have otherwise been consumed by installing intrusive electronic monitoring devices, maintaining software associated with the electronic monitoring devices, and/or the like.

In some implementations, performing the one or more actions includes the network device 105 retraining the machine learning model based on the quantity and the start and stop times. For example, the network device 105 may utilize the quantity and the start and stop times as additional training data for retraining the machine learning model, thereby increasing the quantity of training data available for training the machine learning model. Accordingly, the network device 105 may conserve computing resources associated with identifying, obtaining, and/or generating historical data for training the machine learning model relative to other systems for identifying, obtaining, and/or generating historical data for training machine learning models.

Implementations described herein may utilize phase analysis between subcarrier frequencies to determine entry, exit, and walking motion in the zone. Hence, a variance of subcarrier frequencies may be determined by the phase difference in consecutive packets (via CSI). The variance of the subcarrier frequencies may be calculated as a passive process and a weighted average may be maintained, with a latest reading being assigned a maximum weight. The long-term variance calculation may create a gradual adaptive correction for changes in the zone while ensuring that the long-term variance calculation is not impacted by one-offs. An alternative method may include accounting for both amplitude and phase variance.

Implementations described herein may utilize a phase-weighted variance calculation, as follows:

*New* Subcarrier Variance =(Phase Difference between Consecutive Packets /Average Phase Variance for all subcarrier frequencies)*$w1$ +(*Old* Subcarrier Variance)*$w2$.

Implementations described herein may utilize an amplitude and phase-weighted variance calculation, as follows:

*New* Subcarrier Variance=($w3$*Phase Difference between Consecutive Packets/Average Phase difference+$w4$*Amplitude difference between Consecutive Packets/Average Amplitude difference)*$w1$+(*Old* Subcarrier Variance)*$w2$.

In some implementations, an optimal first weight (w1) may be 0.1, an optimal second weight (w2) may be 0.9, an optimal third weight (w3) may be 0.7, and an optimal fourth weight (w4) may be 0.3, although other values are contemplated for the weights.

In this way, the network device 105 detects people and movement in a zone. For example, the network device 105 may collect CSI associated with the access points 110 communicating with the network device 105 via communication links in the zone. The network device 105 may utilize the CSI to calculate a quantity of people in the zone and/or movement of people in the zone. Thus, the network device 105 may conserve computing resources, networking resources, and/or other resources that would have otherwise been consumed by installing intrusive electronic monitoring devices, maintaining the electronic monitoring devices, maintaining software associated with the electronic monitoring devices, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
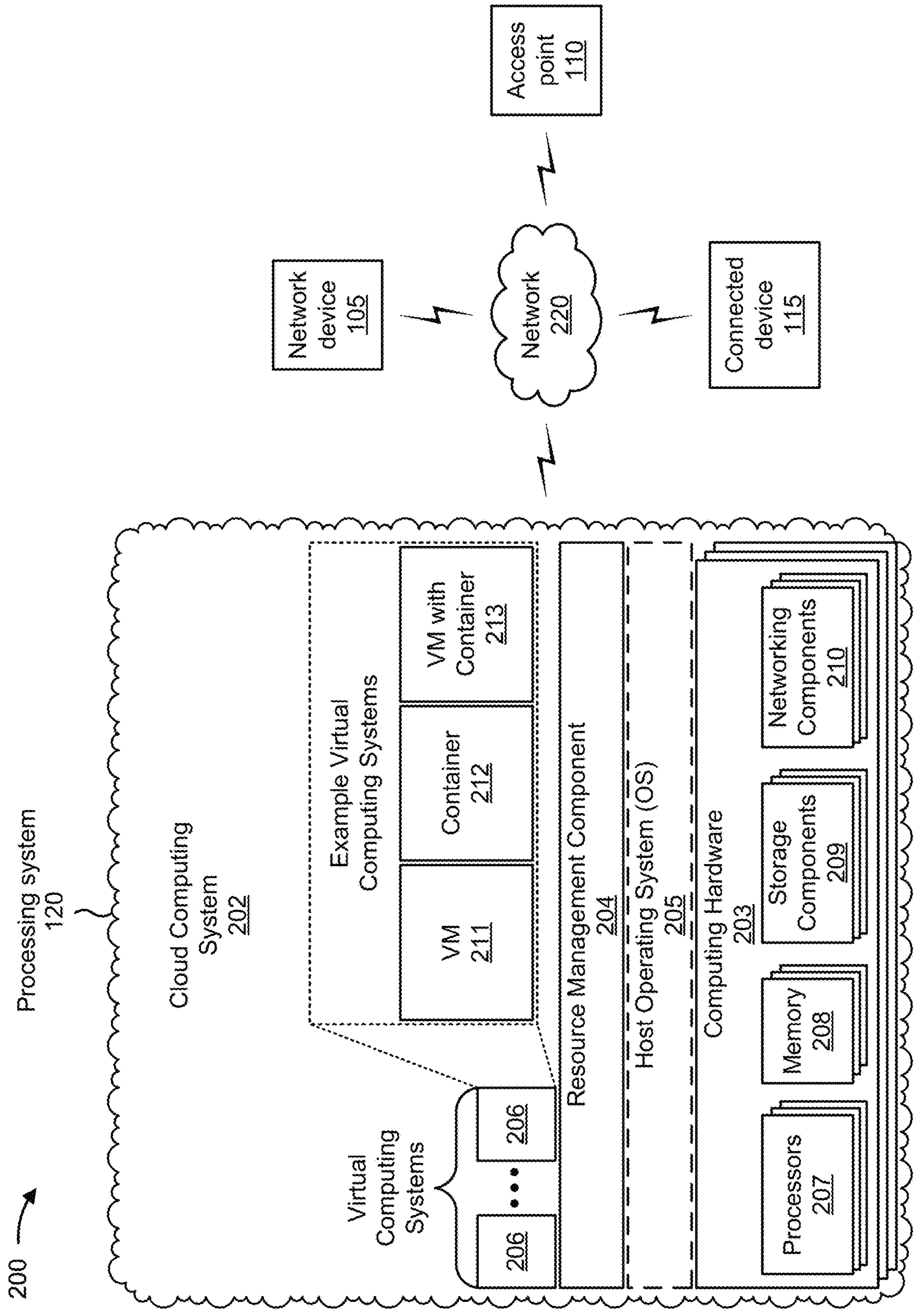
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the processing system 120, which may include one or more elements of and/or may execute within a cloud computing system 202. The cloud computing system 202 may include one or more elements 203-213, as described in more detail below. As further shown in FIG. 2, environment 200 may include the network device 105, the access point 110, the connected device 115, and/or a network 220. Devices and/or elements of environment 200 may interconnect via wired connections and/or wireless connections.

The network device 105 includes one or more devices capable of receiving, processing, storing, routing, and/or providing traffic (e.g., a packet and/or other information or metadata) in a manner described herein. For example, the network device 105 may include a router, such as a label switching router (LSR), a label edge router (LER), an ingress router, an egress router, a provider router (e.g., a provider edge router or a provider core router), a virtual router, or another type of router. Additionally, or alternatively, the network device 105 may include a gateway, a switch, a firewall, a hub, a bridge, a reverse proxy, a server (e.g., a proxy server, a cloud server, or a data center server), a load balancer, and/or a similar device. In some implementations, the network device 105 may be a physical device implemented within a housing, such as a chassis. In some implementations, the network device 105 may be a virtual device implemented by one or more computing devices of a cloud computing environment or a data center. In some implementations, a group of network devices 105 may be a group of data center nodes that are used to route traffic flow through a network.

The access point 110 includes one or more devices capable of receiving, generating, storing, processing, and/or providing information, as described elsewhere herein. The access point 110 may include a communication device and/or a computing device. For example, the access point 110 may include a wireless communication device, a wireless access point (WAP), an STB, a desktop computer, a smart speaker, a smart display device, a smart television, a motion detector, a camera, or a similar type of device.

The connected device 115 includes one or more devices capable of receiving, generating, storing, processing, and/or providing information, as described elsewhere herein. The connected device 115 may include a communication device and/or a computing device. For example, the connected device 115 may include a wireless communication device, an STB, a desktop computer, a smart speaker, a smart display device, a smart television, or a similar type of device.

The cloud computing system 202 includes computing hardware 203, a resource management component 204, a host operating system 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the processing system 120 may include one or more elements 203-213 of the cloud computing system 202, may execute within the cloud computing system 202, and/or may be hosted within the cloud computing system 202, in some implementations, the processing system 120 may not be cloud-based (e.g., may be implemented outside of a cloud computing system) or may be partially cloud-based. For example, the processing system 120 may include one or more devices that are not part of the cloud computing system 202, such as the device 300 of FIG. 3, which may include a standalone server or another type of computing device. The processing system 120 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
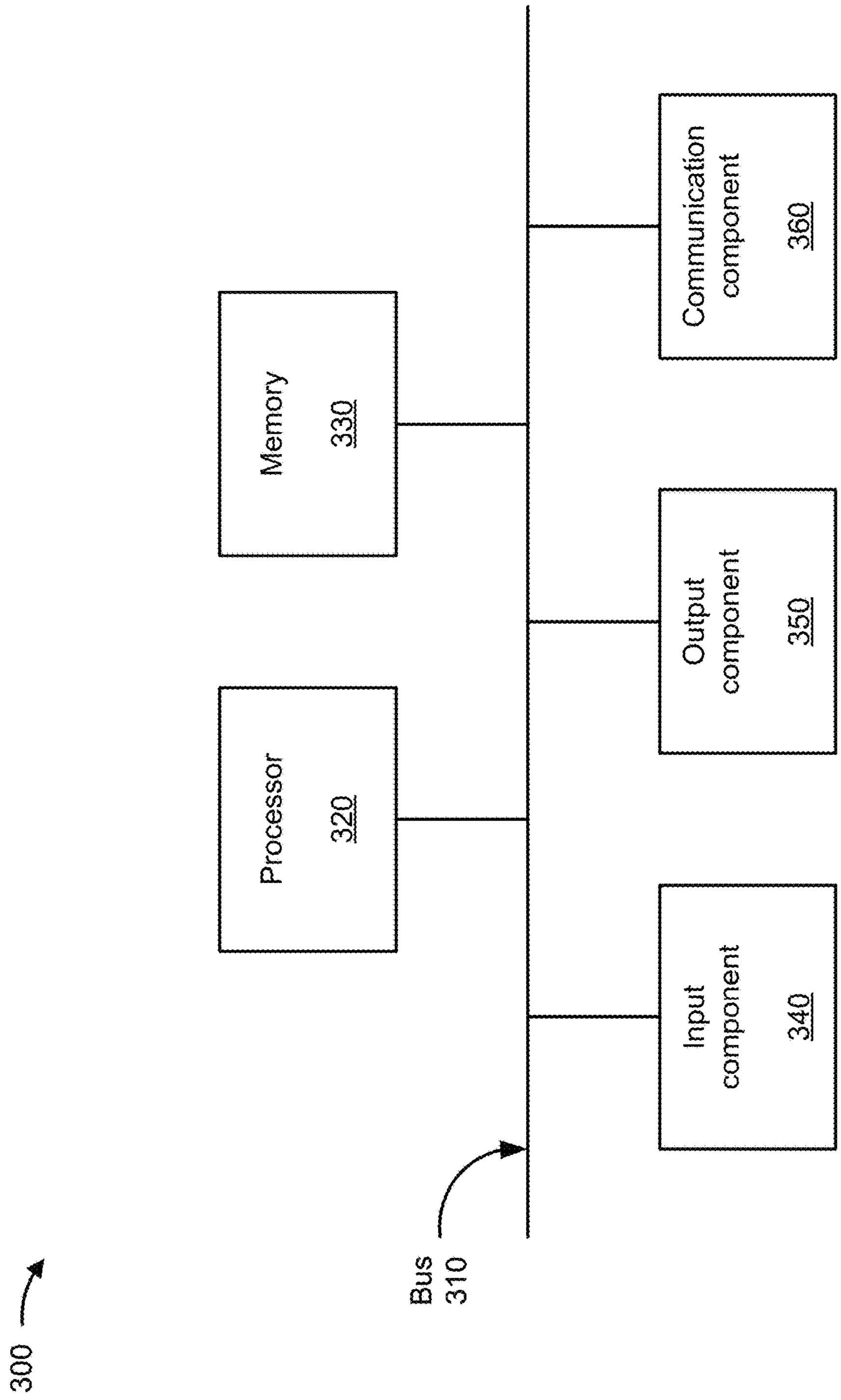
FIG. 3 is a diagram of example components of one or more devices of FIG. 2.

FIG. 3 is a diagram of example components of a device 300, which may correspond to the network device 105, the access point 110, the connected device 115, and/or the processing system 120. In some implementations, the network device 105, the access point 110, the connected device 115, and/or the processing system 120 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
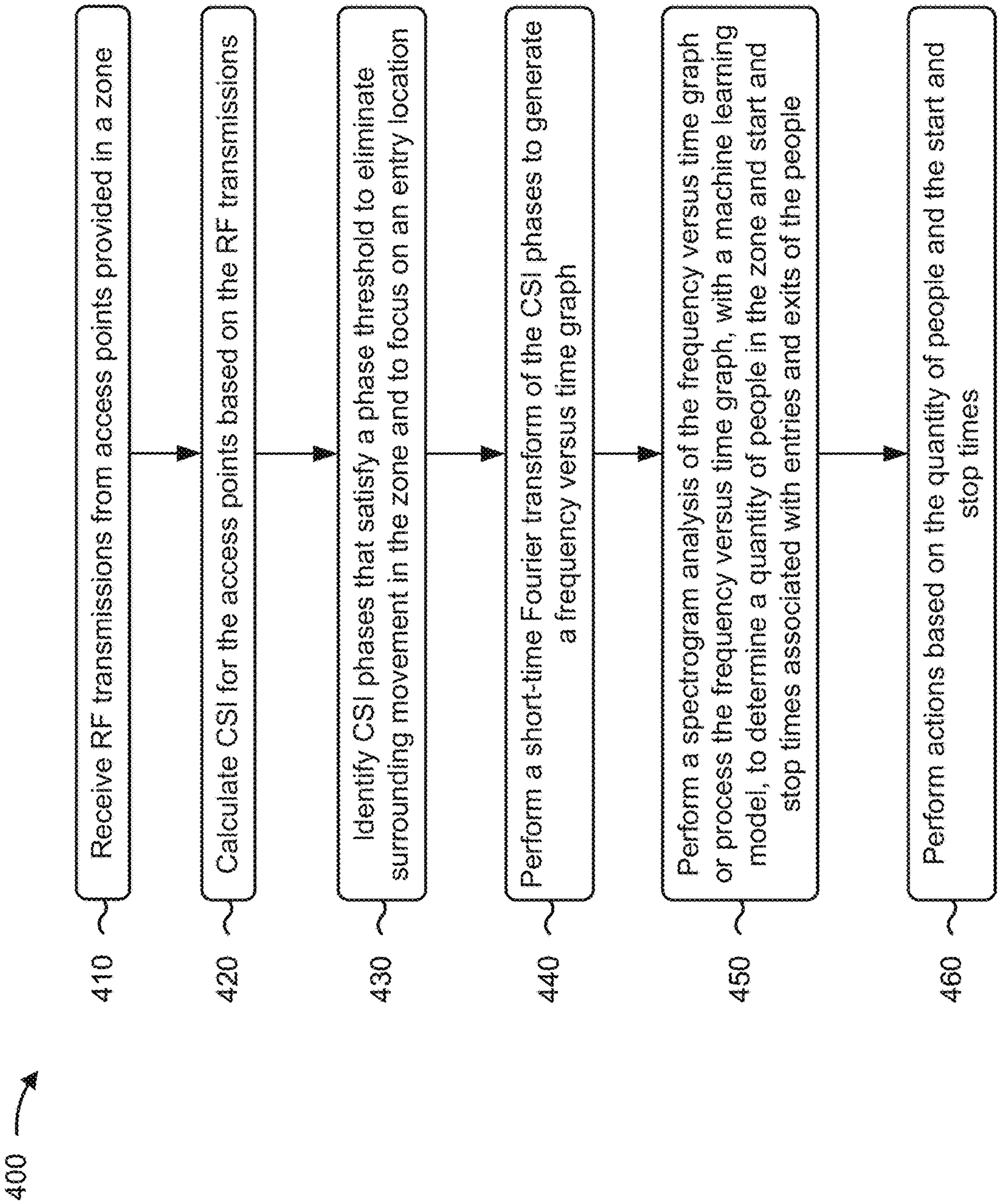
FIG. 4 is a flowchart of an example process for detecting people and movement in a zone.

FIG. 4 is a flowchart of an example process 400 for detecting people and movement in a zone. In some implementations, one or more process blocks of FIG. 4 may be performed by a device (e.g., the network device 105). In some implementations, one or more process blocks of FIG. 4 may be performed by another device or a group of devices separate from or including the device, such as an access point (e.g., the access point 110), a connected device (e.g., the connected device 115, and/or a processing system (e.g., the processing system 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving RF transmissions from access points provided in a zone (block 410). For example, the device may receive RF transmissions from one or more access points provided in a zone, as described above. In some implementations, the device includes one or more of a network device of a network associated with the zone, a connected device configured to communicate with the network device, or a cloud-based device configured to communicate with the network device.

As further shown in FIG. 4, process 400 may include calculating CSI for the access points based on the RF transmissions (block 420). For example, the device may calculate CSI for the one or more access points based on the RF transmissions, as described above.

As further shown in FIG. 4, process 400 may include identifying CSI phases that satisfy a phase threshold to eliminate surrounding movement in the zone and to focus on an entry location of the zone (block 430). For example, the device may identify CSI phases that satisfy a phase threshold to eliminate surrounding movement in the zone and to focus on an entry location of the zone, as described above. In some implementations, the phase threshold is based on the locations of the one or more access points.

As further shown in FIG. 4, process 400 may include performing a short-time Fourier transform of the CSI phases to generate a frequency versus time graph (block 440). For example, the device may perform a short-time Fourier transform of the CSI phases to generate a frequency versus time graph, as described above.

As further shown in FIG. 4, process 400 may include performing a spectrogram analysis of the frequency versus time graph or processing the frequency versus time graph, with a machine learning model, to determine a quantity of people in the zone and start and stop times associated with entries and exits of the people to and from the zone (block 450). For example, the device may selectively perform a spectrogram analysis of the frequency versus time graph to determine a quantity of people in the zone and start and stop times associated with entries and exits of the people to and from the zone, or may process the frequency versus time graph, with a machine learning model, to determine the quantity of people in the zone and the start and stop times associated with the entries and exits of the people to and from the zone, as described above.

In some implementations, performing the spectrogram analysis of the frequency versus time graph to determine the quantity of people in the zone and the start and stop times includes calculating an exponential moving average based on the frequency versus time graph; determining that people are entering or exiting the zone based on the exponential moving average satisfying a noise threshold; calculating the start and stop times and velocities of the people based on the exponential moving average; calculating motion energies of the people based on normalized fast Fourier transform coefficients; and determining the quantity of the people based on the velocities of the people and the motion energies.

In some implementations, the machine learning model includes one of a convolutional neural network model or a deep learning single shot detector model.

As further shown in FIG. 4, process 400 may include performing actions based on the quantity of people and the start and stop times (block 460). For example, the device may perform one or more actions based on the quantity of people and the start and stop times, as described above. In some implementations, performing the one or more actions includes one or more of providing the quantity of people and the start and stop times for display; determining that the quantity satisfies a capacity threshold and causing additional people to be prevented from entering the zone; causing crowd control or foot traffic control to be implemented in the zone based on the quantity and the start and stop times; causing retail displays in the zone to be modified based on the quantity and the start and stop times; or retraining the machine learning model based on the quantity and the start and stop times.

In some implementations, performing the one or more actions includes determining that an intruder has entered the zone, and contacting a law enforcement agency about the intruder. In some implementations, performing the one or more actions includes determining that the quantity satisfies a rental threshold quantity, and generating additional charges for rental of the zone based on determining that the quantity satisfies the rental threshold quantity.

In some implementations, process 400 includes calculating locations of the one or more access points in the zone based on the channel state information, and identifying the channel state information phases includes identifying the channel state information phases based on the locations of the one or more access points. In some implementations, calculating the locations of the one or more access points includes determining times of flight of the radio frequency transmissions based on the channel state information, determining angles of arrival of the radio frequency transmissions based on the channel state information, and calculating the locations of the one or more access points based on the times of flight and the angles of arrival.

In some implementations, process 400 includes determining whether a person is entering or exiting the zone over a time period based on phase differences included in the channel state information. In some implementations, determining whether the person is entering or exiting the zone over the time period includes determining, at a first time, a first phase associated with a first access point of the one or more access points; determining, at the first time, a second phase associated with a second access point of the one or more access points; calculating a first phase difference based on the first phase and the second phase; determining, at a second time, a third phase associated with the first access point; determining, at the second time, a fourth phase associated with the second access point; calculating a second phase difference based on the third phase and the fourth phase; and determining whether the person is entering or exiting the zone based on the first phase difference and the second phase difference.

In some implementations, process 400 includes training the machine learning model with a plurality of frequency versus time graphs associated with different types of zones, prior to processing the frequency versus time graph with the machine learning model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, radio frequency transmissions from one or more access points provided in a zone;

calculating, by the device and based on determining that the device has sufficient resources to process channel state information associated with the one or more access points and based on the radio frequency transmissions, the channel state information;

identifying, by the device, channel state information phases that satisfy a phase threshold to eliminate surrounding movement in the zone and to focus on an entry location of the zone;

performing, by the device, a short-time Fourier transform of the channel state information phases to generate a frequency versus time graph; selectively:

performing, by the device, a spectrogram analysis of the frequency versus time graph to determine a quantity of people in the zone and start and stop times associated with entries and exits of the people to and from the zone; and processing, by the device, the frequency versus time graph, with a model, to determine the quantity of people in the zone and the start and stop times associated with entries and exits of the people to and from the zone; and performing, by the device, one or more actions based on the quantity of people and the start and stop times.

2. The method of claim 1, wherein the device includes one or more of:

a network device of a network associated with the zone, a connected device configured to communicate with the network device, or a cloud-based device configured to communicate with the network device.

3. The method of claim 1, further comprising:

calculating locations of the one or more access points in the zone based on the channel state information, wherein identifying the channel state information phases comprises:

identifying the channel state information phases based on the locations of the one or more access points.

4. The method of claim 3, wherein calculating the locations of the one or more access points comprises:

determining times of flight of the radio frequency transmissions based on the channel state information;

determining angles of arrival of the radio frequency transmissions based on the channel state information; and calculating the locations of the one or more access points based on the times of flight and the angles of arrival.

5. The method of claim 1, further comprising:

determining whether a person is entering or exiting the zone over a time period based on phase differences included in the channel state information.

6. The method of claim 5, wherein determining whether the person is entering or exiting the zone over the time period comprises:

determining, at a first time, a first phase associated with a first access point of the one or more access points;

determining, at the first time, a second phase associated with a second access point of the one or more access points;

calculating a first phase difference based on the first phase and the second phase;

determining, at a second time, a third phase associated with the first access point;

determining, at the second time, a fourth phase associated with the second access point;

calculating a second phase difference based on the third phase and the fourth phase; and determining whether the person is entering or exiting the zone based on the first phase difference and the second phase difference.

7. The method of claim 1, wherein the phase threshold is based on locations of the one or more access points.

8. A device, comprising:

one or more processors configured to: receive radio frequency transmissions from one or more access points provided in a zone;

calculate channel state information for the one or more access points based on the radio frequency transmissions and based on determining that the device has sufficient resources to process the channel state information;

identify channel state information phases that satisfy a phase threshold to eliminate surrounding movement in the zone and to focus on an entry location of the zone, wherein the phase threshold is based on locations of the one or more access points;

perform a short-time Fourier transform of the channel state information phases to generate a frequency versus time graph; selectively:

perform a spectrogram analysis of the frequency versus time graph to determine a quantity of people in the zone and start and stop times associated with entries and exits of the people to and from the zone; and process the frequency versus time graph, with a machine learning model, to determine the quantity of people in the zone and the start and stop times associated with entries and exits of the people to and from the zone; and perform one or more actions based on the quantity of people and the start and stop times.

9. The device of claim 8, wherein the one or more processors, to perform the spectrogram analysis of the frequency versus time graph to determine the quantity of people in the zone and the start and stop times, are configured to:

calculate an exponential moving average based on the frequency versus time graph;

determine that people are entering or exiting the zone based on the exponential moving average satisfying a noise threshold;

calculate the start and stop times and velocities of the people based on the exponential moving average;

calculate motion energies of the people based on normalized fast Fourier transform coefficients; and determine the quantity of the people based on the velocities of the people and the motion energies.

10. The device of claim 8, wherein the machine learning model includes one of a convolutional neural network model or a deep learning single shot detector model.

11. The device of claim 8, wherein the one or more processors are further configured to:

train the machine learning model with a plurality of frequency versus time graphs associated with different types of zones, prior to processing the frequency versus time graph with the machine learning model.

12. The device of claim 8, wherein the one or more processors, to perform the one or more actions, are configured to one or more of:

provide the quantity of people and the start and stop times for display;

determine that the quantity satisfies a capacity threshold and cause additional people to be prevented from entering the zone;

cause crowd control or foot traffic control to be implemented in the zone based on the quantity and the start and stop times;

cause retail displays in the zone to be modified based on the quantity and the start and stop times; or retrain the machine learning model based on the quantity and the start and stop times.

13. The device of claim 8, wherein the one or more processors, to perform the one or more actions, are configured to:

determine that an intruder has entered the zone; and contact a law enforcement agency about the intruder.

14. The device of claim 8, wherein the one or more processors, to perform the one or more actions, are configured to:

determine that the quantity satisfies a rental threshold quantity; and generate additional charges for rental of the zone based on determining that the quantity satisfies the rental threshold quantity.

15. A non-transitory computer-readable medium storing a set of instructions, the set of instructions comprising:

one or more instructions that, when executed by one or more processors of a device, cause the device to:

receive radio frequency transmissions from one or more access points provided in a zone;

calculate channel state information for the one or more access points based on the radio frequency transmissions and based on determining that the device has resources to process the channel state information;

identify channel state information phases that satisfy a phase threshold to eliminate surrounding movement in the zone and to focus on an entry location of the zone;

perform a short-time Fourier transform of the channel state information phases to generate a frequency versus time graph; selectively:

perform a spectrogram analysis of the frequency versus time graph to determine a quantity of people in the zone and start and stop times associated with entries and exits of the people to and from the zone and process the frequency versus time graph with a model, to determine the quantity of people in the zone and the start and stop times associated with entries and exits of the people to and from the zone; and perform one or more actions based on the quantity of people and the start and stop times.

16. The non-transitory computer-readable medium of claim 15, wherein the one or more instructions further cause the device to:

calculate locations of the one or more access points in the zone based on the channel state information, wherein the one or more instructions, that cause the device to identify the channel state information phases, cause the device to:

identify the channel state information phases based on the locations of the one or more access points.

17. The non-transitory computer-readable medium of claim 16, wherein the one or more instructions, that cause the device to calculate the locations of the one or more access points, cause the device to:

determine times of flight of the radio frequency transmissions based on the channel state information;

determine angles of arrival of the radio frequency transmissions based on the channel state information; and calculate the locations of the one or more access points based on the times of flight and the angles of arrival.

18. The non-transitory computer-readable medium of claim 15, wherein the one or more instructions further cause the device to:

determine whether a person is entering or exiting the zone over a time period based on phase differences included in the channel state information.

19. The non-transitory computer-readable medium of claim 18, wherein the one or more instructions, that cause the device to determine whether the person is entering or exiting the zone over the time period, cause the device to:

determine, at a first time, a first phase associated with a first access point of the one or more access points;

determine, at the first time, a second phase associated with a second access point of the one or more access points;

calculate a first phase difference based on the first phase and the second phase;

determine, at a second time, a third phase associated with the first access point;

determine, at the second time, a fourth phase associated with the second access point;

calculate a second phase difference based on the third phase and the fourth phase; and determine whether the person is entering or exiting the zone based on the first phase difference and the second phase difference.

20. The non-transitory computer-readable medium of claim 15, wherein the one or more instructions, that cause the device to perform the spectrogram analysis of the frequency versus time graph to determine the quantity of people in the zone and the start and stop times, cause the device to:

calculate an exponential moving average based on the frequency versus time graph;

determine that people are entering or exiting the zone based on the exponential moving average satisfying a noise threshold;

calculate the start and stop times and velocities of the people based on the exponential moving average;

calculate motion energies of the people based on normalized fast Fourier transform coefficients; and determine the quantity of the people based on the velocities of the people and the motion energies.

* * * * *